April 9, 1929.  M. A. KENDALL  1,708,925

LOADING APPARATUS

Filed July 19, 1927

Inventor:
Myron A. Kendall
By Wilson, Mann & Cox,
Attys.

Patented Apr. 9, 1929.

1,708,925

UNITED STATES PATENT OFFICE.

MYRON A. KENDALL, OF AURORA, ILLINOIS, ASSIGNOR TO STEPHENS-ADAMSON MFG. CO., A CORPORATION OF ILLINOIS.

LOADING APPARATUS.

Application filed July 19, 1927. Serial No. 206,889.

This invention relates to loading apparatus and has for its principal objects to control the flow of material with minimum resistance in operation; to prevent spillage; to prevent the emission of dust; to reduce the required pit depth for skip hoists; to increase the speed of loading.

Figure 1:
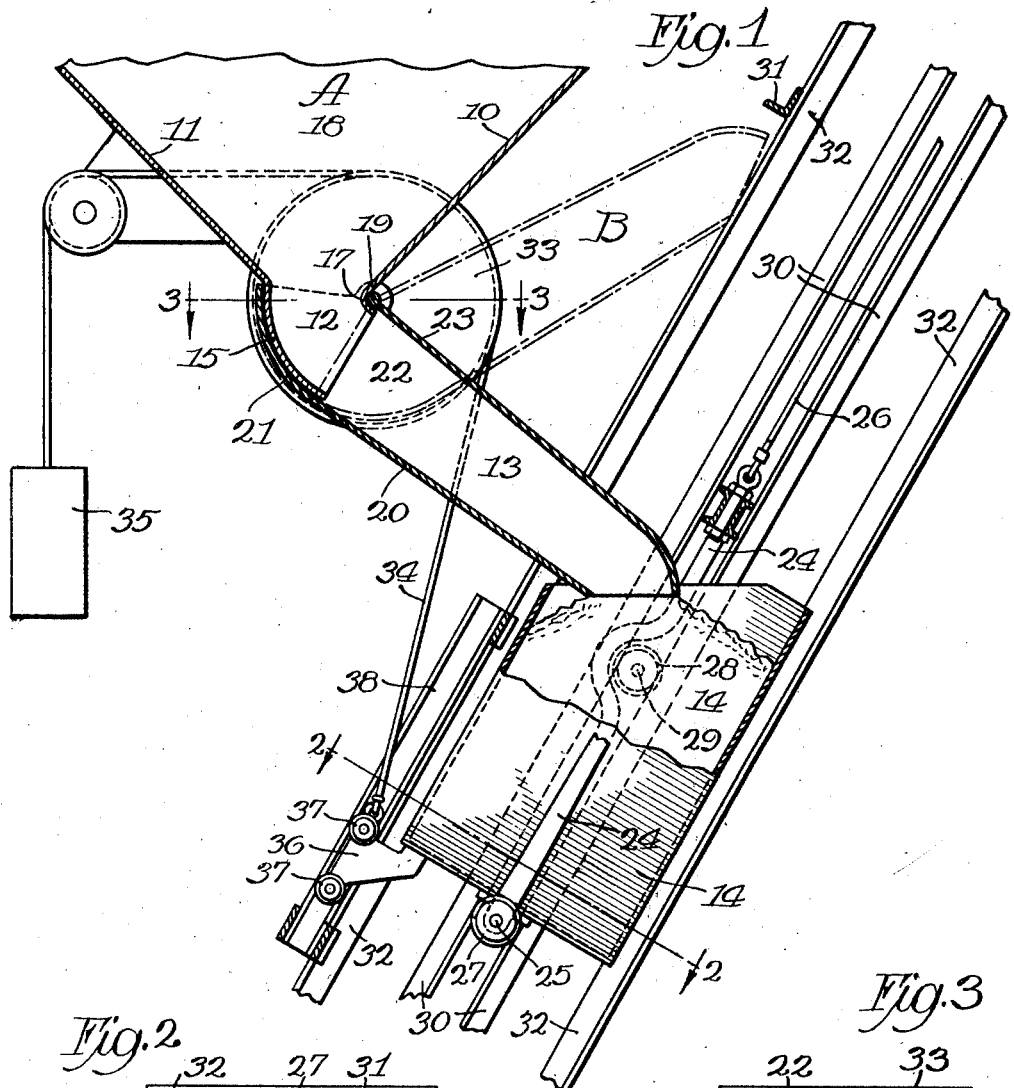
Figure 2:
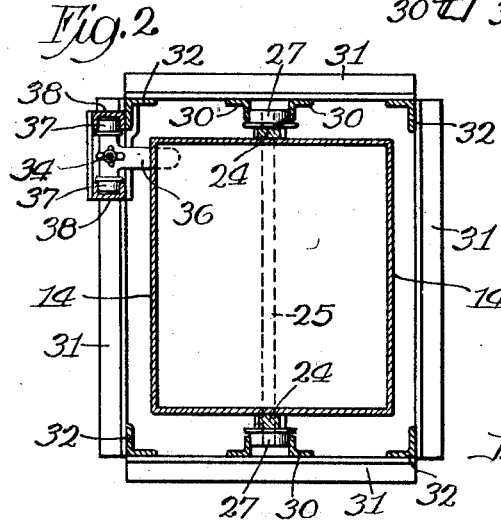
Figure 3:
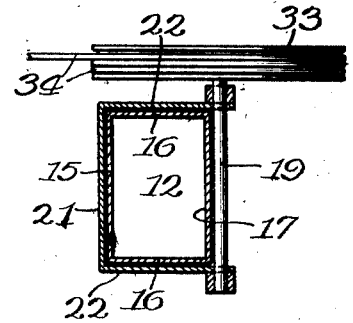

Other objects and advantages of the invention will appear as the disclosure proceeds and the description is read in connection with the accompanying drawings, in which Fig. 1 is a vertical section showing the invention applied to parts of a conventional storage hopper and a skip hoist;

Figs. 2 and 3 are transverse sections taken on lines 2—2 and 3—3 respectively of Fig. 1.

But this specific illustration and the correspondingly specific description are used to make the invention clear and neither is intended to indicate the scope of the invention sought to be protected.

In Fig. 1 A indicates generally a container illustrated as a conventional hopper having its walls 10 and 11 converged to concentrate the material and cause it to discharge through a passage 12 into a chute 13 from which it descends into a bucket 14 of a skip hoist, which is raised to a suitable elevation and descends again for refilling. As the bucket rises it takes the chute 13 with it until the latter reaches the dotted line position indicated at B, where it remains until the bucket assumes a corresponding position on the return, when the chute swings downwardly with the bucket to the position shown in solid lines.

The passage 12 extends through what may be described as a nozzle consisting of a cylindrical wall 15, curving downwardly from the wall 11, two sector shaped walls 16 extending substantially parallel, and a short curved wall 17, curving downwardly from the wall 10. Ordinarily the walls 16 will be extensions of and depend from side walls 18, connecting the walls 10 and 11.

The axis of the cylindrical wall 15 extends transversely to the passage 12 and lies to the right of the wall 17, in Fig. 1. A shaft 19 mounted in suitable bearings has its axis substantially coincident with the axis of the cylindrical wall 15, and the chute 13 is pivotally mounted by means of the shaft 19, to which it is made fast in any suitable manner.

One wall 20 of the chute is curved at the left end, in Fig. 1, on the same axis as the wall 15 to form a cylindrical wall 21 lying just outside the wall 15 and telescoping with it. Corresponding side walls 22 of the chute telescope with the walls 16 of the nozzle and the remaining wall 23 of the chute overlaps the short curved wall 17.

The cylindrical wall 21 and corresponding portions of the side walls 22 form a gate for controlling the flow of material from the hopper A. In the solid line position, shown in Fig. 1, the discharge passage is wide open; in the dotted line position it is completely closed by the gate.

The bucket 14 is equipped with a bail 24 pivoted on the shaft 25 extending across the bottom of the bucket and connected above the bucket to a cable 26 by which the bucket is raised and its descent is controlled.

The bucket is guided in its movements by wheels 27 mounted on the shaft 25 and wheels 28 mounted on stub shafts 29, which run on tracks 30 fixed to cross braces 31, between corner angles 32 of the hoist frame. The rails 30 and wheels are constructed and arranged to dump the bucket at a suitable height and right it again preparatory to reloading, but that operation is not particularly pertinent to the present invention and the corresponding structure is omitted. As a matter of fact, the construction and operation of the hoist, or other conveyance by which the material is removed, is a matter of choice. The shaft 19 is equipped with a drum 33 about which is wound a cable 34 having one end fixed to a counter weight 35 and the other end fixed to a striker 36. This striker is mounted on wheels 37 running in ways 38 fixed to the frame of the hoist.

In Fig. 1 the parts are shown in the position they assume when the bucket is loaded. Suitable mechanism pulls the cable 26 and raises the bucket, which carries the free end of the chute upwardly until it reaches approximately the dotted line position shown at B. A portion of the material in the chute when it is in the solid line position, will be discharged into the bucket before the chute and bucket separate. As the chute swings upwardly the counter weight assumes control and at a selected point becomes sufficient to swing the chute to the dotted line position and hold it there while the bucket ascends, is dumped, and descends. The striker 36, of course, goes up with the bucket and remains in position to be struck by the bucket on the descent. The weight of the bucket on the striker overcomes the resistance of the counter weight and the friction, and swings the chute downwardly to the position shown in solid lines.

Gate devices heretofore used for this general purpose have been so constructed that the closing of the gate involved cutting across the material in the discharge stream and in some instances also involved the pushing of a portion of the material backwardly with respect to the motion in discharge.

It will be noted that with apparatus made according to this invention the stream is not cut nor is there any tendency or need to force any of the material in reverse direction to the flow during loading. As a matter of fact, the available space for material is actually increased as the chute is raised and the gate is closed. Consequently, this structure permits the closing operation to be performed with a minimum of resistance and a minimum of grinding action on the material being handled.

The wall 20 of the chute is preferably as shown arranged tangentially with respect to the wall 21 of the gate, because this arrangement permits the flow of material from the hopper to the bucket to begin as soon as the wall 20 passes below the angle of repose.

This is very important in some installations. For example, where anthacite coal is being handled by a skip hoist, the chute can be arranged at a relatively small angle with respect to the horizontal and the pit made correspondingly much shallower. Furthermore, by allowing the flow of material to begin early the bucket is filled earlier and the speed of operation can be greatly increased.

It is also an important feature of this invention that the joint between the chute and the hopper is always sealed sufficiently tight to prevent any spillage and also to prevent an objectionable emission of dust. In some of the prior gate devices, particularly those in which the stream of material is cut by the gate it is necessary to leave an opening on the side to which the gate moves to prevent lumps from being caught between the gate and the wall. Such openings permit a certain amount of spillage, depending upon the nature of the material handled, and at almost every cycle a blast of dust is emitted through this opening. This objectionable feature is so pronounced in some instances that special casings have been provided.

The essentials of the invention may take different forms in different applications and those skilled in the art will be able from the foregoing to make suitable designs to meet the requirements as they arise without departing from the scope of the invention.

I claim as my invention:

1. In apparatus of the class described, a container having a discharge passage one side of which is defined by a cylindrical wall with its axis transverse to the passage and adjacent to one side thereof, a valve including a larger cylindrical wall pivoted substantially on the axis of the first cylindrical wall, and a chute projecting from the valve.

2. In apparatus of the class described, a container having a discharge passage one side of which is defined by a cylindrical wall with its axis transverse to the passage and adjacent to one side thereof, a valve including a larger cylindrical wall pivoted substantially on the axis of the first cylindrical wall, and a chute projecting from the valve and having one wall substantially tangent to the cylindrical wall of the valve.

3. In apparatus of the class described, a container having a discharge opening and a circular wall at one side of the opening, a valve for controlling the flow through the opening including a circular wall outside of and adjacent to the first mentioned circular wall, a chute including a bottom connected to and extending away from the last mentioned circular wall to direct the discharged material, and a pivot for the valve having its axis through the center of curvature of the circular wall.

4. In apparatus of the class described, a container having a discharge opening and a circular wall at one side of the opening, a valve for controlling the flow through the opening including a circular wall outside of and adjacent to the first mentioned circular wall, and a pivot for the valve having its axis through the center of curvature of the circular walls and the chute having one wall tangent to the circular wall of the valve.

5. In apparatus of the class described, a container, a discharge spout for the container including a circular wall struck from centers on a line transverse to the spout a shaft mounted to rotate about an axis substantially coincident with the axis of said wall, a combined valve and chute fixed to said shaft, the valve including a curved wall slightly larger than the circular wall of the spout and located outside thereof, and a chute having one wall tangent to the curved wall, a drum on the shaft, a cable on the drum, a counter weight connected with the cable at one side of the drum and a striker connected with the cable on the opposite side of the drum, and means cooperating with the chute and striker to operate the valve.

6. In apparatus of the class described, a container, a discharge spout for the container including a circular wall struck from centers on a line transverse to the spout, a shaft mounted to rotate about an axis substantially coincident with the axis of said wall, a combined valve and chute fixed to said shaft, the valve including a curved wall slightly larger than the circular wall of the spout and located outside thereof, the axis of said valve being arranged without said discharge spout, and a chute having one wall tangent to the curved wall, a drum on the shaft, a cable on the drum, a counter weight connected with the cable at one side of the drum and a striker connected with the cable on the opposite side of the drum and a skip hoist bucket cooperating with the chute and striker to operate the valve.

In testimony whereof I affix my signature.

MYRON A. KENDALL.